United States Patent [19]

Wagner

[11] Patent Number: 5,632,628

[45] Date of Patent: May 27, 1997

[54] HEADER FOR USE IN A PRESSURIZED DISC DRIVE

[75] Inventor: Douglas L. Wagner, Newbury Park, Calif.

[73] Assignee: Berg Technology, Inc., Reno, Nev.

[21] Appl. No.: 372,576

[22] Filed: Jan. 13, 1995

[51] Int. Cl.⁶ ................................................. H01R 9/09
[52] U.S. Cl. ................................................. 439/78; 439/27
[58] Field of Search ........................... 439/78, 75, 65, 439/886

[56] References Cited

U.S. PATENT DOCUMENTS

| | | | |
|---|---|---|---|
| 4,487,463 | 12/1984 | Tillotson | 439/78 |
| 5,257,941 | 11/1993 | Lwee et al. | 439/65 |
| 5,329,412 | 7/1994 | Stefansky | 360/97.01 |
| 5,445,527 | 8/1995 | Martin | 439/78 |

FOREIGN PATENT DOCUMENTS

| | | | |
|---|---|---|---|
| 0307675 | 12/1988 | Japan | 439/78 |
| 1435540 | 6/1991 | Japan . | |

*Primary Examiner*—David L. Pirlot
*Assistant Examiner*—Eugene Byrd
*Attorney, Agent, or Firm*—Daniel J. Long; M. Richard Page

[57] ABSTRACT

Disclosed is a header which may be used on a disc drive base or on another such plate between a higher pressure space and a lower pressure space and which will effectively prevent or retard pressure loss from the higher pressure space. A molded plastic wafer member is positioned in an aperture in the plate. A fiberglass reinforced polymer board member is superimposed over the wafer. There are axially aligned transverse apertures in the board member and the wafer member and conductive pins pass through these aligned apertures. Adjacent the apertures in the board member are metallized surfaces and the pins are soldered to board member at this point to effect the pressurized seal.

9 Claims, 1 Drawing Sheet

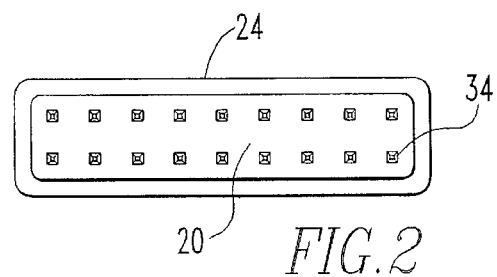
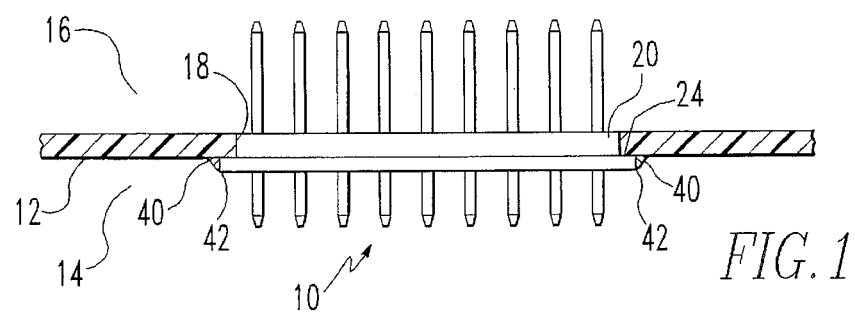
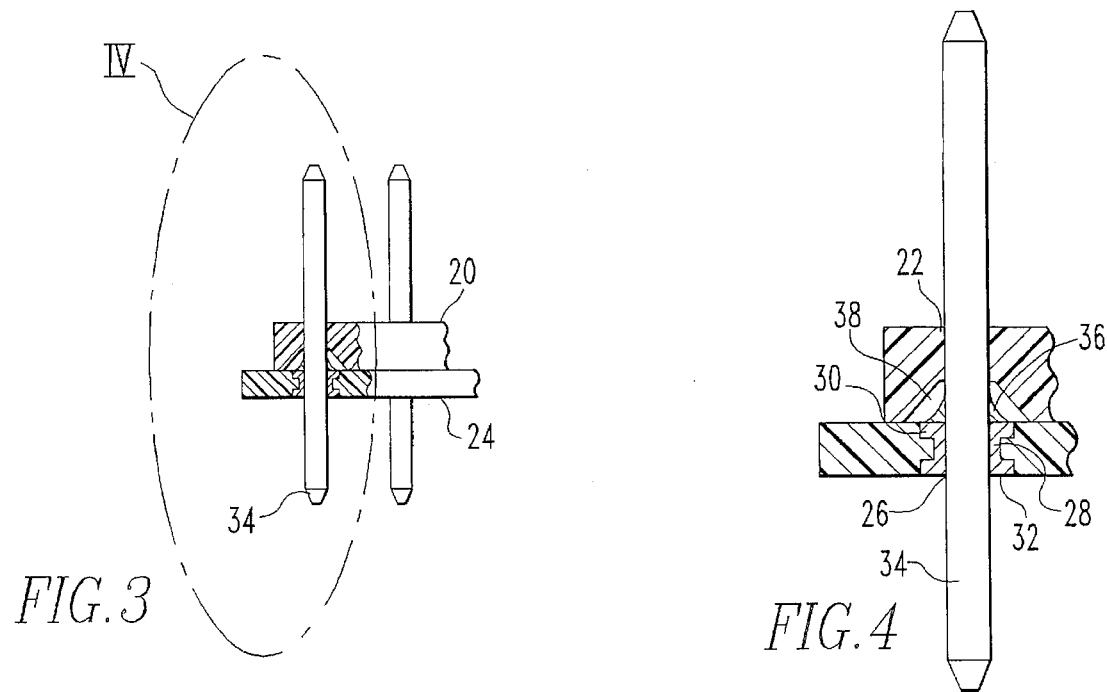

HEADER FOR USE IN A PRESSURIZED DISC DRIVE

BACKGROUND OF THE INVENTION

1. Field of the Invention

The present invention relates to electrical connectors and more particularly to headers which were adapted for use between high pressure areas and low pressure areas.

2. Brief Description of the Prior Developments

In disc drives there is conventionally a header which is mounted in the base plate which is positioned adjacent the head disc assembly. Such a header is shown, for example, at numeral 36 in FIG. 1 of U.S. Pat. No. 5,329,412.

It has been suggested that the head disc assembly be pressurized so as to adapt the disc drive to use in extreme temperature or pressure environments and also to minimize the amount of dust which enter the head disc assembly. Heretofore it has been the practice to mold the conductive pins in the header or to overlay the header surface with an epoxy resin to seal the header for use in such pressurized conditions.

While the above described means for sealing the header have met with some success, a need remains to provide even tighter seals for headers in disc drive base plates. There is also a need for a header which can be used in other environments between a lower pressure space and a higher pressure space.

SUMMARY OF THE INVENTION

The header of the present invention is designed for use in a disc drive base plate which is positioned adjacent a pressurized head disc assembly or in other environments in which the header is mounted in a plate interposed between a higher pressure area and a lower pressure area. A molded plastic wafer member is positioned in an aperture in the plate. A fiberglass reinforced polymer board member is superimposed over the wafer. There are axially aligned transverse apertures in the board member and the wafer member and conductive pins pass through these aligned apertures. Adjacent the apertures in the board member are metallized surfaces and the pins are soldered to the board member at this point to effect the pressurized seal.

BRIEF DESCRIPTION OF THE DRAWINGS

The header of the present invention is further described with reference to the accompanying drawings in which:

FIG. 1 is a front elevational view of the preferred embodiment of the header of the present invention;

FIG. 2 is a top plan view of the header shown in FIG. 1;

FIG. 3 is a partially cut away end view of the header shown in FIG. 1; and

FIG. 4 is an enlarged view of the area within circle IV in FIG. 3.

DETAILED DESCRIPTION OF THE PREFERRED EMBODIMENTS

Referring to the drawings, the header is shown generally at numeral 10. It is mounted in a disc drive base plate 12 between a more highly pressurized space in the head disc assembly 14 and a less highly pressurized space 16. There is an aperture 18 in the base plate in which the wafer member 20 is inserted. It will be understood that the orientation of the plate separating the more and less pressurized spaces is not critical and that this plate may, for example, be vertically as well as horizontally positioned. This wafer member is a molded polymer and is preferably polypropylene sulfide or ULTEM which is available from General Electric Company. There are a plurality of transverse apertures 22 in the wafer member the function of which will be explained hereafter. The wafer member 20 preferably conforms in peripheral size and shape to the aperture 18. The wafer member serves to locate the header in the base plate 12.

Superimposed over the wafer member is a board member 24 which is comprised of fiberglass reinforced epoxy. There are also transverse apertures in this board member as at 26 which are longitudinally aligned with the transverse apertures in the wafer member. It will be appreciated that it would also, within the scope of this invention, be possible to construct the board and wafer members as an integral insulative member which is inserted into the aperture in the plate and which has a plurality of transverse pin receiving apertures which is sealed at its peripheral edge where it abuts the plate. Adjacent these transverse apertures in the board member there are metallized surfaces such as metallized aperture lining 28 and a metallized peripheral surface 30 on the top of the board and metallized peripheral surface 32 on the bottom of the board. Conductive pins as at 34 pass through the aligned apertures in the wafer member and the board member. These pins are retained in the apertures in the wafer member by an interference fit. These pins are fixed to the board member by means of solder points as at 36. These solder points also serve to seal the aligned apertures and prevent loss of pressure from the more highly pressurized space of the head disc assembly. It will also be noted that there are recesses as at 38 in the wafer member which serve to allow room for the solder points. It will be further noted that the solder point is joined to the metallized surfaces adjacent the aperture in the board. The header will be further sealed by means of an epoxy or other polymer sealing material as at 40 at the peripheral edge 42 of the board member where it abuts the disc drive plate.

A header has then been described which may be used on a disc drive base plate or on other such plates between a more highly pressurized space and a lower less highly pressurized space and which will effectively and economically prevent or retard pressure loss from the more highly pressurized space.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A header for use on a disc drive base plate between a more highly pressurized space and a less highly pressurized space comprising a wafer member comprising an insulative molded polymeric material being positioned in and axially aligned with an aperture in said disc drive base plate and said wafer itself having a plurality of transverse apertures, a board member comprising a fiberglass reinforced polymeric material and being superimposed over the wafer member and having a plurality of transverse apertures at least some of said apertures in said board member being axially aligned with one of said apertures in the wafer and said board member having a metallized surface adjacent said apertures; a plurality of conductive pins each of which pins passes through one of the apertures in said board member which is axially aligned with one of said apertures in the wafer member and metallic means for sealing the apertures adjacent the conductive pins in the board member and the conductive pins are fixed to the board member by the metallic means for sealing the apertures in the board means and the conductive pins are retained in the wafer by means of interference fit.

2. The header of claim 1 wherein the pins are soldered to the metalized surfaces adjacent the apertures in the board member.

3. The header of claim 1 wherein there is a recess in the plastic wafer adjacent each of the axially aligned apertures in the board member and the wafer member.

4. The header of claim 3 wherein said recess provides space for said metallic sealing means.

5. The header of claim 1 wherein a sealing means is provided between the board member and the plate.

6. The header of claim 5 wherein the board member has a peripheral edge and the sealing means is positioned at the peripheral edge of the board member.

7. The header of claim 6 wherein the sealing means is a polymeric material.

8. A header for use on a disc drive base plate in making an electrical connection between a more highly pressurized space and a less highly pressurized space separated by said disc drive base plate having an aperture comprising an insulative member inserted in said aperture and having a plurality of transverse apertures, a plurality of conductive pins passing through said apertures and metallic means for sealing said apertures in the insulative means.

9. The header of claim 8 wherein the insulative means has a peripheral edge and a sealing means is provided between said peripheral edge and said plate.

* * * * *